Jan. 12, 1937.  W. RIEHM  2,067,288
INTERNAL COMBUSTION ENGINE
Filed Feb. 1, 1932   2 Sheets-Sheet 1
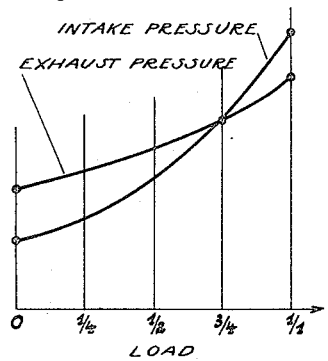
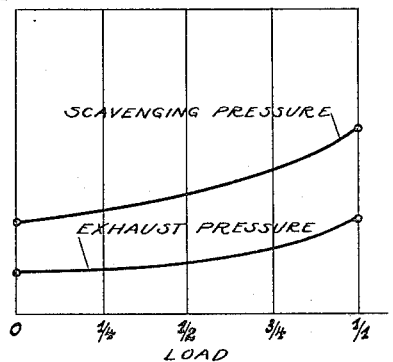
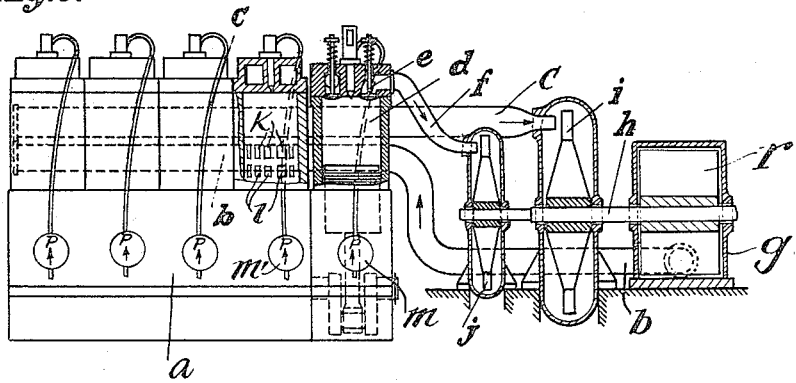

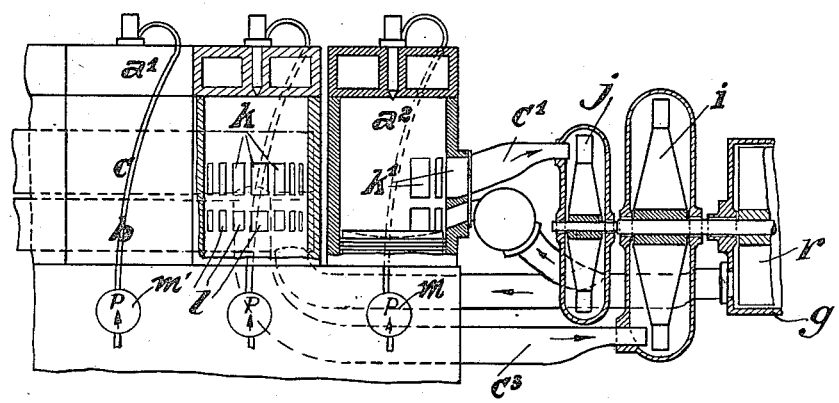
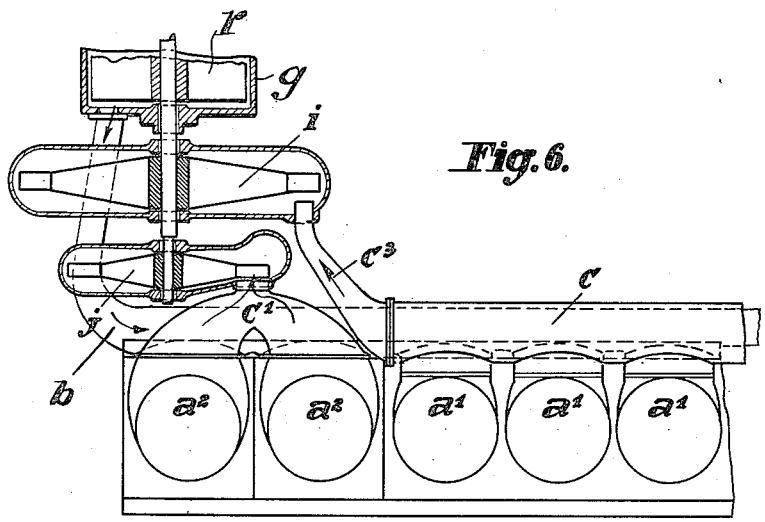
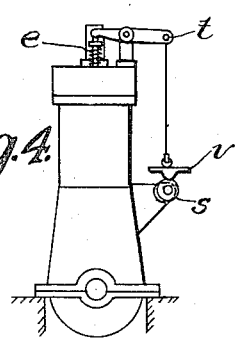

Patented Jan. 12, 1937

2,067,288

UNITED STATES PATENT OFFICE 2,067,288

INTERNAL COMBUSTION ENGINE

Wilhelm Riehm, Augsburg, Germany, assignor to Maschinenfabrik Augsburg-Nurnberg A. G., Augsburg, Germany, a corporation of Germany Application February 1, 1932, Serial No. 590,111
In Germany February 9, 1931

2 Claims. (Cl. 60—13)

This invention relates to internal combustion engines and more particularly to internal combustion engines in which air is supplied to the engine under pressure from an exhaust turbine driven pump.

One object of the invention is the provision of an internal combustion engine of the character mentioned in which one or more cylinders are controlled independently of the other cylinders so that exhaust gases of regulated energy content may be supplied to the turbine for effective operation of the air pump. In accordance with this construction, and especially in two-stroke cycle engines, the scavenging air supplied to the engine from the turbine driven pump will always be a substantial value higher than the back pressures of the exhaust gases.

Other objects and advantages of the invention will be apparent from the following description, the appended claims and the accompanying drawings, in which Fig. 1 is a diagrammatic view showing the intake and exhaust pressures of an engine of an existing type at various engine loads;

Fig. 2 is a diagrammatic view showing the scavenging and exhaust pressures that obtain in a two-stroke cycle engine embodying the present invention;

Fig. 3 is a diagrammatic view of an engine showing one modification of the present invention in which there is an auxiliary cylinder of the four-stroke cycle type for driving the auxiliary turbine blades;

Fig. 4 is a diagrammatic side elevation of the engine shown in Fig. 3 indicating a valve controlling mechanism for the auxiliary cylinder;

Fig. 5 is a diagrammatic showing of another modification of the engine, embodying an auxiliary cylinder of the two-stroke cycle type; and Fig. 6 is a diagrammatic view of a further modification showing auxiliary turbine blades arranged as close as possible to the auxiliary cylinders from which regulated exhaust gases are supplied.

The energy content of exhaust gases of an internal combustion engine is dependent on quantity, pressure and temperature of the gases. Under changing load conditions of an engine the quantity of exhaust gas remains constant but the pressure and temperature both vary with the load. At low loads the energy content of the exhaust gases is quite small.

When the engine exhaust gases are employed for driving a turbine which operates a blower by means of which air is supplied to the engine intake, scavenging air for example for the scavenging of a two-stroke cycle engine, it is quite important that the pressure of the air supplied to the engine should be substantially greater than the exhaust back pressure in order that a flow of air will obtain through the combustion chamber. In existing engine types where an exhaust driven blower connected to all of the cylinders is employed to supply air to the cylinders, the intake pressure, as shown by the diagram of Fig. 1, falls below the exhaust pressure at low engine loads due to the small energy content of the exhaust gases under low load conditions. As the diagram of Fig. 1 shows, it is only when the engine is loaded up to three-fourths capacity, or more, that an effective scavenging of the burnt gases takes place. At lower loads the blower is not effective and in the case of two-stroke cycle engines the burnt gases would therefore not be scavenged under low load conditions.

In accordance with the present invention, one or more of the cylinders are independently controlled so that the energy content of the exhaust gases of these cylinders may be regulated to supply sufficient force to effectively operate the blower regardless of the load conditions in the remaining cylinders. To provide for effective usage of the exhaust gas energy auxiliary turbine blades are employed which are operated from an auxiliary cylinder that may be independently controlled so that the energy content of the exhaust gases it supplies is independent of engine loading. These auxiliary blades may be an auxiliary turbine wheel or a separate turbine mechanically connected to the main turbine. Although the exhaust temperatures of two-stroke cycle engines are appreciably lower than in four-stroke cycle engines, due to the mixing of scavenging air with the exhaust gases, this energy may be effectively employed by the use of the auxiliary cylinders referred to wherein the auxiliary cylinders supply a part of the necessary driving energy for the pump while the rest of the energy is supplied from the exhaust gases of other cylinders of the engine.

Several modifications of the engine are shown in the drawings. Referring first to Fig. 3, an engine is shown having main cylinders operating preferably as two-stroke cycle cylinders. This engine, designated $a$, is shown as having four main cylinders which have a common scavenging air supply pipe $b$ in communication with the inlet slots $l$ and a common exhaust pipe $c$ in communication with the outlet slots $k$. The engine is also provided with an auxiliary cylinder $d$ connected to the same crank shaft as main cylinders $c$. As shown, the cylinder $d$ operates on the four-stroke cycle principle. Air is supplied to the intake air supply pipe $b$ from a pump or blower $g$ having an impeller $r$ which is driven from a turbine $i$ on the pump shaft $h$. The exhaust pipe $c$ supplies exhaust gases from the main cylinders to the turbine $i$. Auxiliary turbine blades are shown at $j$ and these may be an independent turbine on the same shaft as the main turbine. This auxiliary turbine $j$ is supplied with exhaust gases from a conduit $f$ leading from the exhaust valve $e$ of the auxiliary cylinder.

The construction is such that the operation of the auxiliary cylinder $d$ is independent of the engine load. The fuel supply of the auxiliary cylinder can be regulated by any known form of regulatable fuel pump $m$ independently of the two-stroke main cylinders which are supplied by suitable fuel pumps $m'$ to provide exhaust gases of sufficient energy content to produce the necessary turbine driving force in order that the air supplied to the cylinders will always be at a greater pressure than the back pressure of the exhaust gases. The fuel pump details form no part of the present invention, and may be of any character well-known in the art. The control of the pump $m$ may for example be effected in the manner set forth in the prior patent to J. Mahler 1,762,232, owned by the assignee of the present case, and in which an adjustable shaft provides for regulation of the degree of fuel admission. The control of the exhaust valve $e$ of the auxiliary cylinder may be regulated in any suitable manner independently of the loading of the main cylinders in order that the valve $e$ may open earlier or later as desired, so that the exhaust gas energy supplied from this four-stroke cycle cylinder can be readily controlled. Thus, as shown in Fig. 4 an adjustable wedge or cam $v$ may be provided between the valve operating cam $s$ and the valve operating lever $t$ for controlling the exhaust valve timing, such construction forming no part of the present invention and being disclosed in the expired patent of Loffler 928,390. The auxiliary turbine blades $j$ can therefore furnish the additional power requirement and supplement the power derived from the main cylinders to maintain the necessary pressure of the scavenging air.

In Fig. 5 a construction is disclosed wherein a source of high temperature and high pressure exhaust gas is provided by increasing the length of the exhaust slots $k'$ of the auxiliary cylinder $a^2$ so that the exhaust opening into the passage $c'$ to the auxiliary blade portion $j$ will occur prior to the opening time of the slots $k$ of the cylinders $a'$. Further regulation of the turbine operation is provided by independently controlling the auxiliary cylinder as in the construction of Fig. 3 to provide sufficient exhaust energy for effective operation of the scavenging air pump $g$ so that the cylinders are properly charged.

In Fig. 6 the auxiliary turbine blades $j$ are positioned closely adjacent the exhaust outlets of the auxiliary cylinders $a^2$ and the connection from the auxiliary cylinders to the turbine blades is by means of a short passage $c'$. Such an arrangement of parts permits efficient transfer of the exhaust gas energy to the turbine blades with the least possible losses in pressure or temperature so that all of the energy contained in the exhaust gases at the moment of release from the cylinder acts to drive the scavenging pump $g$.

While the method herein described, and the forms of apparatus for carrying this method into effect, constitute preferred embodiments of the invention, it is to be understood that the invention is not limited to this precise method and forms of apparatus, and that changes may be made in either without departing from the scope of the invention which is defined in the appended claims.

What is claimed is:

1. An internal combustion engine comprising a main internal combustion engine cylinder and an auxiliary internal combustion engine cylinder, a pump for supplying scavenging air to said cylinders, turbine driving means for said pump operated by the exhaust gases of said cylinders, means for conveying the exhaust gases from the cylinders to the turbine driving means, said conveying means incorporating exhaust slots in the auxiliary cylinder positioned to open prior to the opening time of the exhaust slots in the main cylinder so as to introduce exhaust gases of greater driving energy to the turbine driving means from the auxiliary cylinder than from the main cylinder.

2. An internal combustion engine comprising a main internal combustion engine cylinder and an auxiliary internal combustion engine cylinder, a pump for supplying scavenging air to said cylinders, turbine driving means for said pump operated by the exhaust gases of said cylinders, means for conveying the exhaust gases from the cylinders to the turbine driving means, said conveying means incorporating exhaust slots in the auxiliary cylinder positioned to open prior to the opening time of the exhaust slots in the main cylinder so as to introduce exhaust gases of greater driving energy to the turbine driving means from the auxiliary cylinder than from the main cylinder, and means for independently controlling the operation of the auxiliary cylinder to provide a regulated exhaust gas flow therefrom.

WILHELM RIEHM.